(12) United States Patent
Furumura (10) Patent No.: US 8,477,072 B2
(45) Date of Patent: Jul. 2, 2013

(54) RADIO FREQUENCY (RF) PARTICLES

(75) Inventor: Yuji Furumura, Yokohama (JP)

(73) Assignee: Philtech Inc., Tokyo (JP)

( * ) Notice: Subject to any disclaimer, the term of this patent is extended or adjusted under 35 U.S.C. 154(b) by 0 days.

(21) Appl. No.: 13/414,794

(22) Filed: Mar. 8, 2012

(65) Prior Publication Data

US 2012/0160920 A1   Jun. 28, 2012

Related U.S. Application Data

(63) Continuation of application No. 12/153,662, filed on May 22, 2008, now Pat. No. 8,154,456.

(51) Int. Cl.
*H01Q 1/38* (2006.01)

(52) U.S. Cl.
USPC ................. 343/700 MS; 340/572.1

(58) Field of Classification Search
USPC ...................... 343/700 MS; 340/572.1, 572.7
See application file for complete search history.

(56) References Cited

U.S. PATENT DOCUMENTS

| | | | |
|---|---|---|---|
| 3,713,148 A | 1/1973 | Cardullo et al. | |
| 5,204,681 A | 4/1993 | Greene | |
| 5,528,222 A | 6/1996 | Moskowitz et al. | |
| 5,581,257 A | 12/1996 | Greene et al. | |
| 6,517,900 B1 | 2/2003 | Pierre | |
| 6,534,387 B1 | 3/2003 | Shinogi et al. | |
| 6,744,335 B2 | 6/2004 | Ryhanen et al. | |
| 7,005,324 B2 | 2/2006 | Imai | |
| 7,061,083 B1 | 6/2006 | Usami et al. | |
| 7,271,076 B2 | 9/2007 | Yamazaki et al. | |
| 7,508,305 B2 | 3/2009 | Yamazaki et al. | |
| 7,632,721 B2 | 12/2009 | Yamazaki et al. | |
| 7,667,310 B2 | 2/2010 | Dozen et al. | |
| 7,683,838 B2 | 3/2010 | Koyama et al. | |
| 7,764,174 B2 | 7/2010 | Rodgers | |
| 7,799,147 B2 | 9/2010 | Matsukawa et al. | |
| 8,178,415 B2 | 5/2012 | Furumura et al. | |
| 2005/0214984 A1 | 9/2005 | Maruyama et al. | |
| 2006/0234512 A1 | 10/2006 | Yuasa et al. | |
| 2007/0166957 A1 | 7/2007 | Kameyama et al. | |
| 2008/0224937 A1 | 9/2008 | Kimura et al. | |
| 2008/0231445 A1 | 9/2008 | Rodgers | |
| 2010/0067166 A1 | 3/2010 | Furumura et al. | |
| 2010/0071746 A1 | 3/2010 | Furumura et al. | |
| 2010/0081235 A1 | 4/2010 | Furumura | |
| 2010/0090925 A1 | 4/2010 | Furumura et al. | |

FOREIGN PATENT DOCUMENTS

| | | |
|---|---|---|
| JP | 05-151428 A | 6/1993 |
| JP | 10-171951 A | 6/1998 |
| JP | 2001-176899 A | 6/2001 |
| JP | 2001-266097 A | 9/2001 |

(Continued)

OTHER PUBLICATIONS

United States Notice of Allowance mailed Jan. 12, 2011 as received in U.S. Appl. No. 12/153,661.

(Continued)

*Primary Examiner* — Douglas W Owens
*Assistant Examiner* — Jennifer F Hu
(74) *Attorney, Agent, or Firm* — Maschoff Brennan (57) ABSTRACT

The present disclosure generally describes radio frequency (RF) particles and an RF powder-containing base including a plurality of such RF particles. The RF particles may include an antenna element and an integrated circuit element coupled together by at least one interconnection. The base may be formed from sheet-like subjects, such as various kinds of cards, bills, and documents. Methods of forming the RF powder-containing base are also generally disclosed.

16 Claims, 5 Drawing Sheets

FOREIGN PATENT DOCUMENTS

| | | | |
|---|---|---|---|
| JP | 2002-329684 | A | 11/2002 |
| JP | 2003-179005 | A | 6/2003 |
| JP | 2004-078991 | A | 3/2004 |
| JP | 2005-203751 | A | 7/2005 |
| JP | 2005-209104 | A | 8/2005 |
| JP | 2005-242629 | A | 9/2005 |
| JP | 2005-252242 | A | 9/2005 |
| JP | 2007-128433 | A | 5/2007 |
| JP | 2007-128434 | A | 5/2007 |
| JP | 2008-134694 | A | 6/2008 |
| JP | 2008-134816 | A | 6/2008 |
| JP | 2008-135446 | A | 6/2008 |
| JP | 2008-135951 | A | 6/2008 |

OTHER PUBLICATIONS

United States Notice of Allowance mailed Oct. 17, 2011 as received in U.S. Appl. No. 12/153,661.

United States Office Action mailed Sep. 24, 2010 as received in U.S. Appl. No. 12/153,661.

United States Office Action mailed May 24, 2011 as received in U.S. Appl No. 12/153,661.

Usami, Mitsuo, "An Ultra-Small RFID Chip: μ-Chip", 2004 IEEE Asia-Pacific Conference on Advanced System Integrated Circuits(AP-ASIC2004)/Aug. 4-5, 2004, pp. 2-5.

Kamal Sarabandi, "Compact Reconfigurable HF-UHF Antennas", Jun. 7, 2004, http://www.dtic.mil/cgi-bin/GetTRDoc?AD=ADA430016.

Tetsuo Nozawa, "Hitachi Achieves 0.05-mm Square Super Micro RFID Tag, Further Size Reductions in Mind", Tech-On Nikkei Business Publications, Feb. 20, 2007, http:l/techon.nikkeibp.co.jp/english/NEWS_EN/20070220/127959/.

Usami, Mitsuo, Akira Sato, Hisao Tanabe, Toshiaki Iwamatsu, Shigeto Maegawa, Yuzuru Ohji, "An SOI-Based 7.5 um-Thick0.15×0.15 mm sq RFID Chip", 2006, IEEE International Solid-State Circuits Conference, IEEE 2006.

Mura et al., "RF-Powder:Fabrication of 0.15 mm-Si-powder Resonating at Microwave Frequencies", Microwave Conference(Proceedings of the 37th European Microwave Conference), Oct. 2007, Munich, Germany, pp. 392-395.

Miller, Paul, "Hitachi's RFID powder freaks us the heck out", Feb. 14, 2007, http:/www.engadget.com/2007/02/14/hitachixrfid-powder-freaks-us-the-heck-out.

Nakamoto, Hiroyuki, "A Passive UHF RF Identification CMOS Tag IC Using Ferroelectric RAM in 0.35-", IEEE Journal of Solid-State Circuits, Jan. 2007, vol. 42, Issue 1, pp. 101-110.

Chen, Liu, "Thermal Modeling for System-in-a-Package Based on Embedded Chip Structure", Oct. 2005, Polymers and Adhesives in Microelectronics and Photonics, Polytronic, 2005, 5th International Conference, pp. 224-227.

Dailey, Linda, "Hitachi Researchers Develop Powder-Sized RFID chips", IEEE Computer Society, May 2007, vol. 40, No. 5, p. 23.

Hara, Yoshhiko, "Hitachi Advances Paper-thin RFID chip", EE Times News & Analysis, Feb. 6, 2006.

Usami, Mitsuo, "The μ-Chip, an Ultra-Small 2.45 GHz RFID Chip for Ubiquitous Recognition Applications", Applied Physics, 2004, vol. 73, No. 9, Japan, pp. 1179-1183.

U.S. Office Action dated Jan. 11, 2011 as received in U.S. Appl. No. 12/153,662.

U.S. Office Action dated Jun. 10, 2011 as received in U.S. Appl. No. 12/153,662.

U.S. Office Action dated Jul. 29, 2010 as received in U.S. Appl. No. 12/153,662.

FIG.6 though the RF
RADIO FREQUENCY (RF) PARTICLES

CROSS-REFERENCE TO RELATED APPLICATION

This patent application is a continuation of U.S. patent application Ser. No. 12/153,662, filed May 22, 2008, now U.S. Pat. No. 8,154,456, which is incorporated herein by reference.

TECHNICAL FIELD

The present disclosure relates to a radio frequency (RF) particles, a radio frequency powder-containing base and in particular, to RF powder-containing base which can read information or the like via radio waves.

BACKGROUND

Currently, it is considered that integrated circuit (IC) tags are products indicating the beginning of the ubiquitous age. Labels, Suica cards, FeRAM cards, or the like have been developed previously as RF-ID (micro radio identification). Many people expect that an IC tag market will certainly grow larger in the future. However, the market has not grown enough to be expected. The reason is that there are also problems such as cost, security, and privacy other than technologies, which must be solved socially.

In addition, the RF-ID technology is considered to apply to identification of documents which have proprietary nature such as bills or securities. Forgery of bills and the like have been problems, and embedding the IC tags into the bills or the like can be devised as a method for solving those problems. However, the above-described method has not been achieved yet due to a high cost or a large size of the IC tags.

The cost of the IC tag can be reduced by reducing the size of the IC tag chip. It is because the number of IC tag chips obtained from a single wafer can be increased if the size of the IC tag chips is reduced. An IC tag chip of 0.4 millimeters square has been developed so far. This IC tag chip can read memory data of 128-bit via a 2.45 GHz microwave (refer to, for example, Non-patent Document 1).

Meanwhile, the RF-ID technology applicable to identification of bills, credit cards, or the like using components other than the IC tag is also devised. As an example thereof, a plurality of resonators which resonate to a plurality of radio frequencies are made to be contained in a substrate composed of paper or plastic in Patent Document 1. The resonator is a passive individual resonator, and resonates when a plurality of resonators are radiated by electromagnetic waves with radio frequency, and thus an arrangement of the plurality of resonators is grasped by detecting the resonance, allowing the substrate to be identified.

Patent Document 1: Japanese Unexamined Patent Publication (Kokai) No. 10-171951.

Non-patent Document 1: "Micro Radio IC Tag Chip 'μ-Chip'" by Mitsuo Usami in Applied Physics, Vol. 73, No. 9, 2004, p.1179-p.1183.

SUMMARY

Technologies described herein generally include a radio frequency particle. The radio frequency particle may include an integrated circuit overlying and in direct contact with a substrate, an insulating layer overlying and in direct contact with the integrated circuit such that the integrated circuit is positioned between the substrate and the insulating layer, an antenna element overlying and in direct contact with the insulating layer and at least one interconnection connecting the integrated circuit with the antenna element.

Technologies described herein generally include a radio frequency powder-containing base. The radio frequency base may include a plurality of radio frequency powder particles dispersed therein. Each of the radio frequency powder particles may include an integrated circuit overlying a substrate, an insulating layer overlying the integrated circuit, at least one antenna element disposed in the insulating layer and having an exposed surface and at least one interconnection extending from the integrated circuit to the antenna element.

Technologies described herein generally include methods of forming a base including a plurality of radio frequency powder particles. Such a method may include forming a first adhesive-containing solution containing first radio frequency powder particles responsive to electromagnetic waves having a first frequency, forming a second adhesive-containing solution containing second radio frequency powder particles responsive to electromagnetic waves having a second frequency different from the first frequency and applying the first and second adhesive-containing solutions to the base.

DETAILED DESCRIPTION

Hereinafter, embodiments (examples) according to the present disclosure will be explained based on accompanying drawings.

Figure 1:
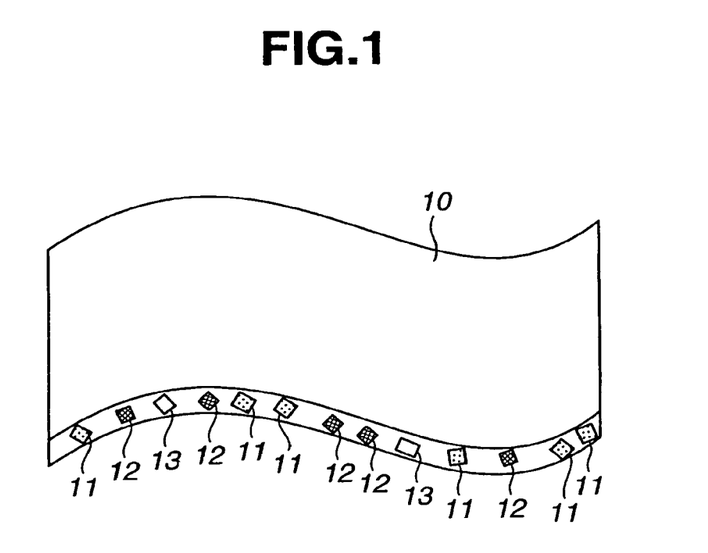
FIG. 1 is a sectional perspective view showing an embodiment of an RF powder-containing base according to the present disclosure.

FIG. 1 is a sectional perspective view showing an RF powder-containing base according to an embodiment of the present disclosure. FIG. 1 is an enlarged view showing that three kinds of RF powder particles 11, 12, and 13 are contained in a base 10 made of paper as an example. Herein, a bill is used as an example of the base 10. The RF powder particles 11, 12, and 13 have sensitivity to the electromagnetic waves with different frequencies, respectively. Although the RF powder particles 11, 12, and 13 are shown in FIG. 1 while slightly changing sizes thereof, it is shown to easily understand that the RF powder particles 11, 12, and 13 have sensitivity to the electromagnetic waves with different frequencies, respectively, and actually, the sizes Actually, each of the above-described RF powder particles 11, 12, and 13 is collectively treated in a use form of a powdery substance due to a large number of or a large quantity of RF powder particles, and configures the RF powder. Although the RF powder particles 11, 12, and 13 are shown as 13 pieces in total in FIG. 1, the number of RF powder particles is not limited thereto. If the use form of the RF powder of the powdery substance is taken into consideration, the RF powder particles 11, 12, and 13 dispersively spread over the base 10 with a sheet-like shape in practice. As described above, the base 10 which contains a large number of RF powders thereinside or a surface thereof will be referred to as "RF powder-containing base 10."

Additionally, the above-described "RF powder" means a powder, in which each of a large quantity of particles composing the powder (powdery substance) has an electrical circuit element for transmitting/receiving signals (information) with an external reader/writer device via radio waves (radio-frequency electromagnetic waves), and a normal use form is a collective form.

Figure 2:
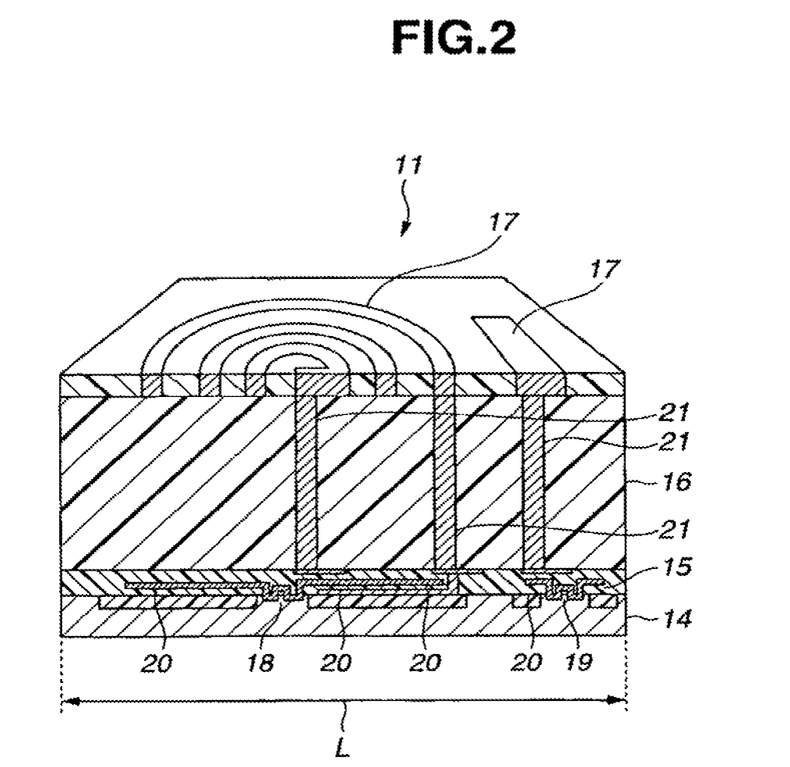
FIG. 2 is a three dimensional view showing a sectional main part of a single RF powder particle contained in the RF powder-containing base according to the present embodiment.

FIG. 2 is a sectional view showing a single RF powder particle (11). In FIG. 2, a thickness of the RF powder particle 11 is exaggeratedly shown. The RF powder particle 11 has a three-dimensional shape, in which with respect to a plurality of rectangular planes in outer front sides thereof, a size of the rectangular plane is not less than 0.05 millimeters square and not more than 0.30 millimeters square, and more particularly 0.15 millimeters square. In the RF powder particle 11 according to the present embodiment, a side L in the front shown in FIG. 2 is 0.15 millimeters (150 micrometers).

The RF powder particle 11 has an integrated circuit (IC) 15 provided with a memory function, such as FeRAM, formed on a substrate 14, such as silicon or the like, an insulating layer 16 with a thickness of approximately 30 micrometers formed on the integrated circuit 15, and an antenna element 17 responsive to an electromagnetic wave with a specific frequency (for example, 2.45 GHz) formed on the insulating layer 16. As an example of electrical circuit elements, transistors 18 and 19 which configure the integrated circuit 15, interconnections 20 connected to the transistors 18 and 19, and interconnections 21 for connecting the antenna element 17 and the integrated circuit 15 are shown in FIG. 2. The interconnections 21 are embedded in the insulator 16.

Figure 3:
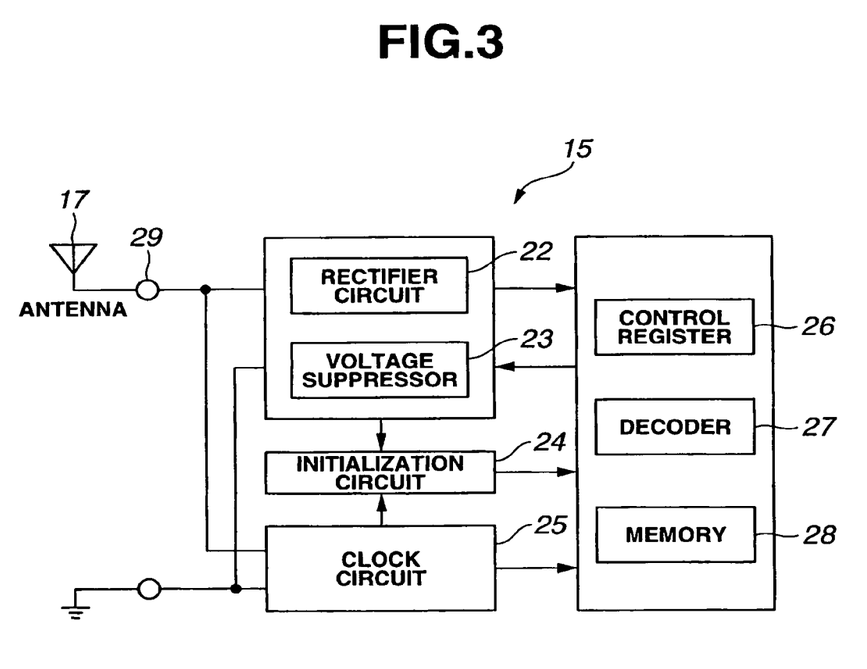
FIG. 3 is a block diagram showing a configuration example of an integrated circuit contained in the RF powder particle of the RF powder-containing base according to the present embodiment.

FIG. 3 shows one example of a circuit configuration of the integrated circuit 15 provided in the RF powder particle 11. The integrated circuit 15 is provided with a rectifier circuit 22, a voltage suppressor 23, an initialization circuit 24, a clock circuit 25, a control register 26, a decoder 27, and a memory 28, for example. These circuit elements have following functions, respectively.

The rectifier circuit 22 has a function for rectifying radio-frequency electromagnetic waves incoming from the outside into a DC power supply voltage. For example, the 2.45 GHz electromagnetic wave which is introduced via the antenna 17 and an antenna terminal 29 is converted into a voltage for operating internal analog circuits and digital circuits by the rectifier circuit 22. When the RF powder particles 11 approach a reader/writer 32 (refer to FIG. 5) and the rectifier circuit 22 generates the excessive voltage in response to excessive electromagnetic wave energy from the reader/writer 32, the voltage suppressor 23 suppresses the voltage and prevents semiconductor devices in the integrated circuit 15 from being damaged. The initialization circuit 24 controls start and end of the circuit operation and the clock circuit 25 demodulates a clock waveform. The memory 28 is, for example, an FeRAM in which identification numbers are stored. Contents in the Memory 28 are selected by the control register 26 and the decoder 27 to be transmitted to the reader/writer 32.

While the RF powder particles 12 and 13 have substantially the same structures as that of the above-described RF powder particle 11, resonance circuit systems including the antenna elements 17 respectively owned by the RF powder particles 11, 12, and 13 are designed to have sensitivities to the electromagnetic waves with different frequencies. For example, the RF powder particle 11 is provided with the resonance circuit system which has sensitivity to the 2.45 GHz electromagnetic wave, the RF powder particle 12 is provided with the resonance circuit system which has sensitivity to a 2.0 GHz electromagnetic wave, and the RF powder particle 13 is provided with the resonance circuit system which has sensitivity to a 1.9 GHz electromagnetic wave.

Next, with reference to FIGS. 4 through 6, actual usages and actions of the RF powder-containing base (base 10) according to the embodiment of the present disclosure will be explained.

As illustrated in FIG. 1, the sheet-like base 10 such as a bill contains a considerable number of RF powder particles (11, 12, and 13). A thickness of the base 10 is exaggeratedly and enlargedly shown in FIG. 4. When it is made to be contained in the base 10, aqueous solutions (ink, paint, or the like) filled with an adhesive fixative containing the RF powder is made to soak into the base 10 with a dropper or the like. Thus, the RF powder is attached on a surface of the base 10 or is made to soak into the inside of the base 10. Alternatively, the RF powder may be mixed into the base 10 when manufacturing the base 10. For example, if the base 10 is paper, the RF powder is mixed thereinto when making paper.

The base 10 is scanned by the reader/writer 32 connected to a computer 31. The computer 31 reads information included in each of the plurality of RF powder particles via the reader/writer 32. The computer 31 is provided with a display 31a, a main unit 31b, a keyboard 31c, or the like.

The above-described reader/writer 32 has a read terminal 33 (refer to FIG. 6) and reads information provided from the RF powder particles 11 to 13 using radio-frequency electromagnetic waves (RF) in a specific frequency band including 2.45 GHz by the read terminal 33. The frequencies used in each of the plurality of RF powder particles are different from each other, and are, for example, 1.9 GHz, 2.0 GHz, and 2.54 GHz as described above. Hence, the reader/writer 32 is configured to read the electromagnetic waves of, for example, 1.5 to 3.0 GHz frequency band as the above-described specific frequency bands at proper timing. In order to read information from each of the, plurality of RF powder particles 11 to 13 in the base 10 via the read in terminal 33, the reader/writer 32 performs a scanning operation in a certain direction along the surface of the base 10, and also changes the frequency used for transmission/reception within the specific frequency band.

Figure 5:
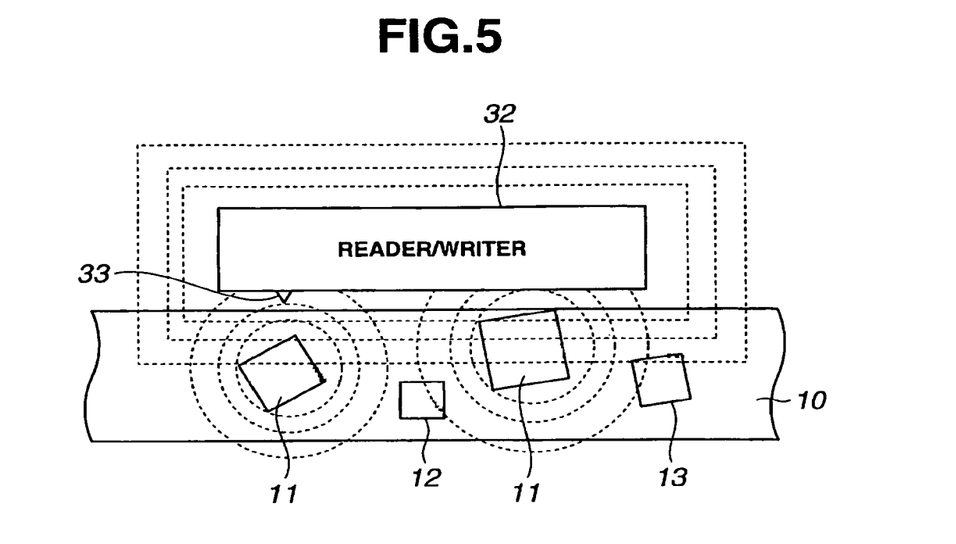
FIG. 5 is a schematic view showing a signal exchange between a reader/writer and the RF powder-containing base.

FIG. 5 schematically shows that a radio-frequency electromagnetic wave E with a specific frequency included in a predetermined frequency band is radiated from the read terminal 33 of the reader/writer 32. Specifically, it shows that when the frequency of the electromagnetic wave E radiated from the read terminal 33 of the reader/writer 32 is set to 2.45 GHz, the RF powder particle 11 is being responsive to the electromagnetic wave E. At this time, neither of the other RF powder particles 12 and 13 is responsive to the electromagnetic wave with a frequency of 2.45 GHz radiated from the read terminal 33. Here, since the wavelength of 2.45 GHz band is approximately 15 centimeters, the RF powder particles 11 to 13 are contained in a single wave, so that an electromagnetic field of the electromagnetic wave is combined with antennas to thereby cause energy transfer. It will be described in such a way that the radiated electromagnetic waves are transmitted and received seen from a distance.

Figure 6:
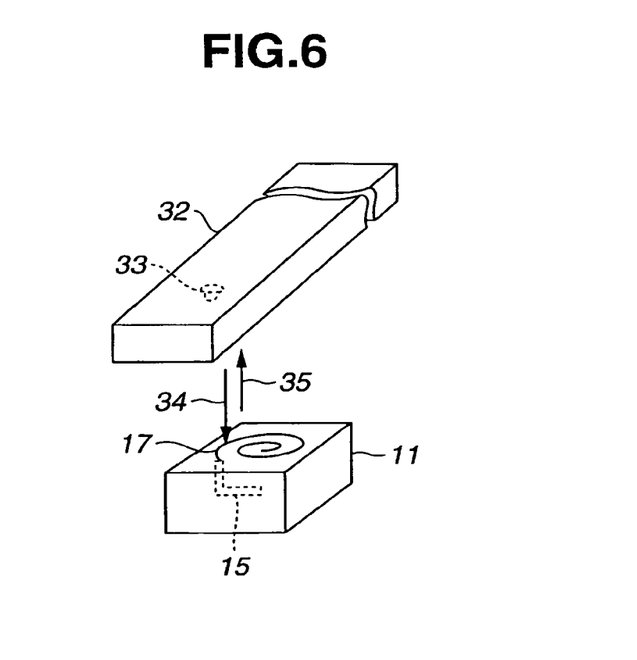
FIG. 6 is a view showing a transmission/reception relation of a radio-frequency electromagnetic wave with the reader/writer in an existence position of a single RF powder particle.

FIG. 6 shows a state where signals (information) are transmitted and received based on the radio-frequency electromagnetic wave (frequency of 2.45 GHz given from the reader/writer 32 in an existence position of the RF powder particle 11. Assuming that the read terminal 33 provided in the bottom surface of the reader/writer 32 performs a scanning operation by scanning movements of the reader/writer 32 and is located above the RF powder particle 11. In this case, the read terminal 33 radiates the radio-frequency electromagnetic waves with several different frequencies, and when the electromagnetic wave of 2.45 GHz to which the RF powder particle 11 is responsive is radiated (an arrow 34 shown in FIG. 6), the RF powder particle 11 receives the radio-frequency electromagnetic wave, operates the integrated circuit 15 based on energy thereof, and extracts (or writes) information from the memory 28 to radiate it as the radio-frequency electromagnetic wave (an arrow 35 shown in FIG. 6). The electromagnetic wave radiated by the RF powder particle 11 is received by the read terminal 33 of the reader/writer 32. The read terminal 33 of the reader/writer 32 transmits the information received from the RF powder particle 11 to the computer 31, and the information provided from the RF powder particle 11 is memorized in the memory of the computer 31 in a position where there is the RF powder particle 11.

Similarly, in the case where the reader/writer 32 performs scanning movements, and the read terminal 33 thereof is located above the RF powder particle 12, when the electromagnetic wave radiated by the read terminal 33 reaches the frequency of 2.0 GHz to which the RF powder particle 12 is responsive, the RF powder particle 12 receives the radio-frequency electromagnetic wave, the integrated circuit 15 operates, and the information from the memory 28 is read (or written). Furthermore, similarly, in the case where the reader/writer 32 performs scanning movements, and the read terminal 33 thereof is located above the RF powder particle 13, when the electromagnetic wave radiated by the read terminal 33 reaches the frequency of 1.9 GHz to which the RF powder particle 13 is responsive, the RF powder particle 13 receives the radio-frequency electromagnetic wave, the integrated circuit 15 operates, and the information from the memory 28 is read (or written).

Figure 4:
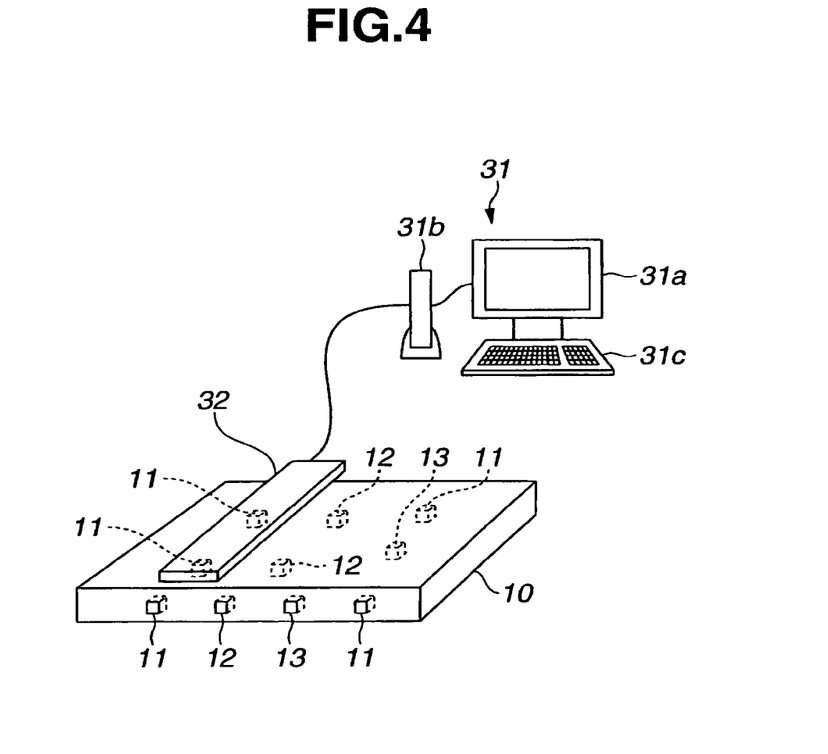
FIG. 4 is a device configuration view illustrating an actual usage and an action of the RF powder-containing base according to the present embodiment.

By the reader/writer 32 scanning over the whole inside and surface of the base 10 shown in FIG. 4, position information and frequency information of the RF powder particles 11 to 13 which exist throughout a scanning area in the base 10, and various kinds of information written in each of them are memorized in the memory of the computer 31. The information memorized in the memory of the computer 31 is displayed on the display 31a thereof if needed.

Producing bills by making the above-described RF powder particles 11 to 13 to be contained in the bills using the above-described method, or making the RF powders 11 to 13 to be contained in important documents such as official documents, licenses, insurance cards, the other important cards, or the like makes it possible to utilize the RF powder 11 for forgery discrimination of the bills, authentication of the important documents, or the like. Additionally, since the RF powder 11 is used as the powder (powdery substance) of collectively utilizing a plurality or a large number of RF powder particles instead of using it as an individual single IC tag chip in this case, the treatment is easy.

When the RF powder-containing base 10 is a bill, it is possible to discriminate whether or not the bill 10 is forgery based on the information displayed on the display 31a.

The RF powder-containing base 10 is produced in such a way that a large quantity of the RF powder particles 11, 12, and 13 separately manufactured in a predetermined RF powder manufacturing process are blended at a proper rate to produce an RF powder and the RF powder is made to be contained in the base 10. As a manner of making the RF powder particles to be contained in the base 10, for example, three kinds of adhesive containing aqueous solutions which respectively contain a required number of RF powder particles 11, 12, and 13 are written in the bills or the like with the dropper or the like. Thus, the RF powder particles 11, 12, and 13 are attached to and made to soak into a specific point.

In addition, the information memorized in the memory 28 of the integrated circuit 15 of the RF powder particles 11, 12, and 13 may be memorized before writing it in the bills or the like, or the information may be memorized by the reader/writer 32 into the RF powder particles 11, 12, and 13 contained in the bills after making the RF powder particles 11, 12, and 13 to be contained in the bills or the like to then produce the bills as the RF powder-containing base 10.

Note that while an example of the bills as the RF powder-containing base has been explained in the present embodiment, plastic cards such as paper for documents, business cards, credit cards may also be used other than that. For example, even for paper in which the RF powders are made to be contained to then be arranged and on which nothing is drawn, it is possible to create images on a display screen of the computer by reading the paper with the reader/writer, based on an arrangement of each RF powder particle, a frequency of the radio-frequency electromagnetic wave to which each RF powder particle is responsible, and information in the memory of each RF powder particle.

Meanwhile, although an example in which three kinds of RF powder particles 11, 12, and 13, but not limited to, are made to be contained in the base 10 has been explained in the present embodiment, the number of kinds of the RF powder made to be contained in the base may be not more than or not less than three.

Furthermore, although it has been explained in the present embodiment that a plurality kinds of RF powder particles are made to be intentionally contained in the base, the RF powder particles in which a distribution has occurred on a frequency to which the RF powder is responsible may be made to be incidentally contained in the base.

The RC powder containing base according to the present disclosure is utilized as bills, credit cards, documents, or the like whose forgery can be prevented.

What is claimed is:

1. A radio frequency particle, comprising:
   an integrated circuit overlying and in direct contact with a substrate;
   an insulating layer overlying and in direct contact with the integrated circuit such that the integrated circuit is positioned between the substrate and the insulating layer;
   an antenna element overlying and in direct contact with the insulating layer; and at least one interconnection coupling the integrated circuit with the antenna element,
   wherein a longest side of the radio frequency particle is less than or equal to 0.30 millimeters.

2. The radio frequency particle of claim 1, further comprising an electrical circuit element for exchanging signals with an external device via radio frequency electromagnetic waves.

3. The radio frequency particle of claim 2, wherein the electrical circuit element comprises at least one transistor.

4. The radio frequency particle of claim 1, wherein the substrate comprises silicon.

5. The radio frequency particle of claim 1, wherein the integrated circuit comprises at least one of a rectifier circuit, a voltage suppressor, an initialization circuit, a clock circuit, a control register, a decoder, and memory.

6. The radio frequency particle of claim 1, wherein the at least one interconnection is embedded in the insulating layer.

7. A radio frequency powder-containing base, comprising:
a plurality of radio frequency powder particles dispersed in the base, each of the radio frequency powder particles, comprising:
an integrated circuit overlying a substrate;
an insulating layer overlying the integrated circuit;
at least one antenna element disposed in the insulating layer and having an exposed surface; and
at least one interconnection extending from the integrated circuit to the antenna element,
wherein the plurality of radio frequency powder particles comprises first particles sensitive to electromagnetic waves having a first frequency and second particles sensitive to electromagnetic waves having a second frequency, the first frequency being different from the second frequency.

8. The radio frequency powder-containing base of claim 7, further comprising third particles sensitive to electromagnetic waves having a third frequency different from the first and second frequencies.

9. The radio frequency powder-containing base of claim 7, wherein the radio frequency powder particles are dispersed within a region of the base having a sheet-like shape.

10. The radio frequency powder-containing base of claim 7, wherein the base comprises at least one of paper and plastic.

11. The radio frequency powder-containing base of claim 7, wherein the base comprises a bill, a credit card, a document, or a business card.

12. A method of forming a base including a plurality of radio frequency powder particles, each of the radio frequency particles comprising an integrated circuit overlying a substrate, an insulating layer overlying the integrated circuit, at least one antenna element disposed in the insulating layer and having an exposed surface, and at least one interconnection extending from the integrated circuit to the antenna element, the method comprising:
forming a first adhesive-containing solution containing the first radio frequency powder particles responsive to electromagnetic waves having a first frequency;
forming a second adhesive-containing solution containing the second radio frequency powder particles responsive to electromagnetic waves having a second frequency different from the first frequency; and
applying the first and second adhesive-containing solutions to the base.

13. The method of claim 12, wherein applying the first and second adhesive-containing solutions to the base comprises dispersively spreading the first and second radio frequency powder particles over the base.

14. The method of claim 12, wherein applying the first and second adhesive-containing solutions to the base comprises soaking the base in an aqueous solution filled with an adhesive fixative containing the first or second radio frequency powder particles to attach the first or second radio frequency powder particles to the base.

15. The method of claim 12, wherein applying the first and second adhesive-containing solutions to the base comprises applying the first and second adhesive-containing solutions to at least one of paper and plastic.

16. The method of claim 12, wherein applying the first and second adhesive-containing solutions to the base comprises applying a mixture of the first and second adhesive-containing solutions to form a sheet-like layer of the first and second radio frequency powder particles over the base.

* * * * *

UNITED STATES PATENT AND TRADEMARK OFFICE
CERTIFICATE OF CORRECTION

PATENT NO. : 8,477,072 B2
APPLICATION NO. : 13/414794
DATED : July 2, 2013
INVENTOR(S) : Furumura It is certified that error appears in the above-identified patent and that said Letters Patent is hereby corrected as shown below:

Title Page 2, in Item (56), under "OTHER PUBLICATIONS", in Column 2, Line 13, delete "0.35-"," and insert -- 0.35-μm Technology", --, therefor.

In the Specification

In Column 2, Line 64, delete "sizes" and insert -- sizes of the RF powder particles 11, 12, and 13 are substantially the same. --, therefor.

In the Claims

In Column 8, Lines 7-8, in Claim 12, delete "the first" and insert -- first --, therefor.

In Column 8, Line 11, in Claim 12, delete "the second" and insert -- second --, therefor.

Signed and Sealed this
Twenty-ninth Day of October, 2013

Teresa Stanek Rea
*Deputy Director of the United States Patent and Trademark Office*